United States Patent [19]

Beltchev

[11] Patent Number: 4,999,118
[45] Date of Patent: Mar. 12, 1991

[54] METHOD FOR DEWATERING AND DRYING A LIQUID/SOLID SLURRY AND AN APPARATUS FOR USING THE METHOD

[75] Inventor: Beltcho A. Beltchev, Sofia, Bulgaria

[73] Assignee: Bulgarska Industrialna Stopanska Associatia, Sofia, Bulgaria

[21] Appl. No.: 265,194

[22] Filed: Oct. 31, 1988

Related U.S. Application Data

[63] Continuation-in-part of Ser. No. 910,904, Sep. 24, 1986, abandoned.

[51] Int. Cl.$^5$ ............................................. B01D 25/168
[52] U.S. Cl. ..................................... 210/771; 210/774; 210/185
[58] Field of Search ............... 210/774, 770, 225, 771, 210/185

[56] References Cited

U.S. PATENT DOCUMENTS

| | | | |
|---|---|---|---|
| 3,342,123 | 9/1967 | Ermakov et al. | 210/225 X |
| 3,608,610 | 9/1971 | Greatorex | 210/185 X |
| 4,209,404 | 6/1980 | Yoshida | 210/225 |

*Primary Examiner*—Frank Spear
*Attorney, Agent, or Firm*—Klein & Vibber

[57] ABSTRACT

The invention discloses an improved method, and apparatus for utilizing the method, for dewatering and drying a liquid/solid slurry. Unlike the prior known method of consecutive material thickening, filtering, crushing and then subsequent drying achieved with an appropriate for each process apparatus, in the present invention all these processes are achieved with only one apparatus.

The apparatus for the implementation of this method comprises consecutively connected filter press, feeding-compressing container with pressure feed chamber and an inbuilt heat exchanger and vacuum collector with a vacuum pump. The advantages of using this apparatus and method are its compactness, limited space required, low energy consumption, environmental cleanliness and the fact that the separated liquid phase can be used as a heat carrier for industrial and municipal needs. In addition, the disclosed process if fully automated.

The summary time for the consecutive implementation of the prior known method, including thickening, filtering, crushing and drying is considerably decreased using the present invention.

The present invention eliminates the transportation costs and facilitates, which are unavoidable in the utilized up to now method.

Moreover, in the drying process only a fraction of the residual liquid is vaporized, which pushes out the remaining part without its evaporation. Further, there is extraction of salts dissolved in the liquid, since the liquid is not vaporized.

2 Claims, 6 Drawing Sheets

METHOD FOR DEWATERING AND DRYING A LIQUID/SOLID SLURRY AND AN APPARATUS FOR USING THE METHOD

This application is a continuation-in-part of application Ser. No. 910,904, filed Sept. 24, 1986, now abandoned.

FIELD OF THE INVENTION

This invention relates to a method and apparatus for dewatering and drying of mixtures of liquids and solids dispersed in them (liquid/solid slurry).

DESCRIPTION OF PRIOR ART

There is a prior-known method for dewatering and drying where the materials are gradually thickened, filtered, broken down and then subjected to drying.

The equipment needed for this method includes four separate units connected in sequence by the required conveying connections, and the slurry must be thickened, filterpressed (or vacuum filtered), crushed and then dried.

This method is effected in four different sectors, and large-sized high energy consuming apparatus is required as well as large floor space and expensive maintenance. Furthermore, they are ecologically incompatible with the environment. The sedimentation-thickening process is quite slow, and the separated liquid phase is not sufficiently clear.

According to U.S. Pat. No. 1,049,715 to Hopkins et al, the filtered material (cake) stored and accumulated in spacing frames is heated by a heating fluid through filter cloths, through the "hollow spaces" formed by filter cloths and projections disposed on the surfaces of filter plates and through the walls of the filter plates themselves. The liquid contained in the cake and transformed into vapor is separated through the filter cloths, the hollow spaces formed by the filter cloths and the plate walls as well as through the holes, and is collected in condenser by vacuum pump.

A disadvantage of Hopkins is that the thermal energy required to vaporize the filtered liquid contained in the cake is transmitted by means of three intermediary partitions: the walls of filter plates covered with projections, the "hollow spaces" and filter cloths. This causes great energy losses having in view the continuous flow-out of vapor separated from the cake through the hollow spaces together with the additionally obtained thermal energy-through the walls and projections of filter plates.

Another disadvantage of Hopkins is that the cake is heated through its surfaces which are in contact with filter cloths. Thus the vaporization of the residual liquid starts at first from the outer layers and afterwards-from the inner layers in order to achieve a complete transformation of all the liquid into steam (vapor). The authors of this reference state that there is performed a complete vaporization of any liquid present in the precipitate (cake). Thus the Hopkins device cannot carry out a partial vaporization of the residual liquid contained in the cake so that the vapors obtained from the partial vaporization could push away the rest of the unvaporized liquid from the cake capillaries and save the energy necessary for its vaporization.

Yet another disadvantage of Hopkins is that the filter cloths possess low heat conductivity and the direct heating from the walls and the projections of the filter plates requires their manufacture from expensive heat resisting material.

Also according to Hopkins, the sealing of the filter cloths in the site of their clamping between the spacing frames and the filter plates is achieved by means of pressurized seal liquid feeding through channels to filter plates and through channels to spacing frames. For that purpose an air chamber is placed to equalize the pressure of pump with the pressure of the seal liquid. Such a construction is expensive and requires additional elements as the indicated tanks, air chamber and the described tube connections and valves.

Hopkins describes an air chamber connected at its lower end to a pump and at its upper end to seal liquid storage tank. Thus, the chamber equalizes the pressure of the pump with the pressure of the storage tank. According to their description, the seal liquid may escape by capillary attraction from the bulging edges of the filter cloths. This causes energy and time losses in filtration. The air chamber cannot be utilized as a gas accumulator which will maintain the pressure necessary for the filtration process in case of emergency stopping of the the pump or at the end of the filtration process when low quantities of liquid are separated and the energy consumption of pump is nearly the same as in the beginning of the filtration process.

According to Hopkins the filtrate is removed during the filtration process through discharge tube and valve. When the filter press is filled, the valve is closed and the filter plates are heated and the vaporized liquid is collected in the condenser which is connected to the vacuum pump. The disadvantage of such kind of design is that heat energy accumulated in the condensate cannot be utilized in the next filtration and drying cycles.

U.S. Pat. No. 4,226,721 to Baas discloses plates released one after the other by means of a carriage or slide. This is a serious drawback as much time is lost, additional mechanisms (carriage, slide) are required etc. Baas proposes a rod, the lower part of which is V-shaped and moves vertically to separate the plates one from another. This also is a drawback for the forced vertical tear-off of the cake is stretching the filtration cloths.

Baas proposes a means for spraying the filtration cloths in order to clean them. This also is a drawback since much water is consumed that ought to be cleaned and recuperated prior to its repeated use.

In the case of wet and sticking cake, Baas proposes a scraper in order to scrape the cake from the plates. This is also a drawback since scraper cleaning of the filtration cloths reduces their exploitation period.

The carriage or slide, rod with V-shape, spraying device and scraper require expensive and complicated additional devices as for their operation so for their synchronizing for automatic operation.

U.S. Pat. No. 644,121 to Bradley discloses that the filtrated cake is accumulated in rings disposed between the filtration plates. This is a serious drawback since the rings can not create conditions for drying of the cake.

Another drawback of Bradley is that in opening the filter press the filtered cake remains in the rings from where it is difficult to be discharge. Further on a great part of the cake remains stuck to the cloths of two adjacent filter plates and this requires an additional operation for its removal.

In Bradley there is a vertical opening for the flow out of the filtrate from the filtration plate. This is a drawback since it is not possible to extract the filtrate only from one common opening of the press. Furthermore, the filtrate is poured directly in the tank where the filtered cake is discharged. Feeding of the required slurry is effected by upper vertical pipes which feed the suspension to the rings limited by the filter plates. The filter plates (frames) and rings of Bradley cannot be provided with devices for automatic discharge because a part of the filtered cake will always remain on the horizontal bottom of the ring.

U.S. Pat. No. 4,209,404 of Takuji Yosida discloses a filter press provided with filter cake discharge means, which facilitate the discharge of cake formed in the press.

Filtered cake, adhering to the filter cloths is discharged by means of two hammers, arranged symmetrically on both sides of the filter press. The hammers are driven in a circular motion in a vertical plane, striking a frictionally sliding on the upper portions of the filter cloths, which are attached to appropriate horizontal steel bars.

The steel bars are suspended on springs and neighbouring bar pairs are connected at both ends with a chain.

A disadvantage of Yoshida is that the filter plates are discharged in succession for cloths shake off. This limits the filter press performance.

Another disadvantage of Yoshida is that the filtrated cake discharge means must move synchronously in succession with the opening and discharging of the filter plates, and for every plate discharge, the vertical distance must be adjusted.

In the Yoshida disclosure it is not clear how the feeding opening of the filter plates is sealed. Provided that most of the available filter plates have a central feeding opening, from FIG. 2 indicating an open position of two neighbouring cells, it is not clear how the feeding openings of the filter cloths and those on the filter plates would coincide with the necessary precision and how they would be sealed. It is practically possible that in the process of filter cloths shake off, cake pieces may drop through the feeding holes of the filter cloths in the space between filter cloths and filter plates. At that, the Yoshida invention did not solve the problem of cyclic filter cloths discharge; this process is unavoidable in all filter presses, where only filtration is accomplished.

U.S. Pat. No. 2,247,892 to Schneible discloses ventilation means. However, Schneible does not treat the problem of from where and in what manner the entering compensating air comes, or which elements it will flow over in order to reach his suction apparatus.

U.S. Pat. No. 3,655,049 to Kracklauer discloses shaker brackets attached to filter plates lying on longitudinal rods having an eccentric cross section. In case of this design, after each lowering of the respective cam of the eccentric downwards, the lugs will fall on the eccentric itself so that the latter will be damaged and worn while in the same time they will bend in the middle. This deteriorates the shaking off and reduces the operational life of the eccentric and brackets or lugs. Furthermore, the impacts will be endured by the couple of sleeve bearing which also will reduce their exploitation period of life.

British Patent No. 961,609 to Worth discloses electric heaters placed into fixed head and moving head. Worth indicates that the invention consists in a filter press comprising an assembly of filter plates and an electric heating element located outside the assembly of filter plates. The construction thus relates to a filter press in which may be filtered a certain quantity of a liquid that is heated to a determined temperature to achieve the required sterility. Such a construction is inapplicable to slurry filtration. This design does not permit separation of the cake and its drying in the press itself by means of partial vaporizing of the cake liquid and to utilize the thus obtained vapor to push away the residual capillary liquid.

SUMMARY OF THE INVENTION

The present invention's aim is to set up a method and apparatus where dewatering and drying are performed simultaneously using one processing unit, and the dried material can be automatically discharged without adhering to the heating and filtering surfaces, and to reduce energy consumption and production costs.

This problem is solved by the present method where the dewatering and drying of mixtures of liquids and solid particles dispersed in them (slurry) occurs by simultaneous effect of decompression and steam pressure set up inside the material where the separated liquid phase is collected under vacuum.

The apparatus required by this method comprises a filter press, feeding-compressing container with pressure feed chamber and inbuilt heat exchanger and a vacuum collector with vacuum pump, all connected consecutively.

The filter press used for the realization of this method consists of alternating sequentially connected vacuum filter plates and heat plates, the heat plates being suspended on vibration parallels and connected between a fixed head, linked with a vacuum collector and a feeding-compressing container and a self-propelled head linked by assembled connections to the vacuum collector and the feeding-compressing container, and a hopper with a screw-worm fitted under the heads and the plates. Airducts are arranged to the upper part of the hopper over which mobile screens are mounted suspended onto a ventilation dome.

The heat plate is made of a closed frame, divided symmetrically in its largest section by a heating element of two reception chambers connected to a feed hole. A main draining canal is fitted within the frame, insulated from the reception chambers. The heating element consists of an electrical or fluid membrane insulated from the main draining canals. The vacuum filter plate is made of a closed frame and a vacuum chamber. Porous partitions with a feed hole, the latter isolated from the vacuum chamber, are fitted in the frame, connected by means of intermediate canals to the vacuum chamber. The heat plates are suspended over vibration parallels by means of sliding rollers. The vacuum filter plates are connected to the heat plates by pivots. The self-propelled head is suspended by rollers on a ventilation dome, and is connected to fixed horizontal screws by means of rotating nuts.

A motor reducing gear is attached to the self-propelled head in which the rotating nuts are fitted. The internal part of the self-propelled head is a vacuum filter plate, the main draining canal of which is connected, by its external end, to a collector (manifold) pipe which is connected by a dismantlable vacuum connection to a pipe of a heat-exchanger inbuilt into the feeding-compressing container. The hole of the filter plate of the self-propelled head is connected by a dismantlable pressure connection and a pressure feed pipe to the feeding-compressing container. The fixed head is connected to the support columns and the ventilation dome. Its internal part is a vacuum filter plate, the main draining canal of which, by its external end, is connected to the collector (manifold) pipe, the latter being connected to a vacuum collector across the heat-exchanger. The vacuum filter plate hole of the fixed head is connected to the feeding-compressing container.

The filter press is fully closed, a hopper with a discharging screw-worm being mounted in its lower part, under the heat and the vacuum filter plates. Forced airducts are fitted over the hopper walls, over which mobile screens are suspended. The ventilation dome is designed along the press' longitudinal axis and is connected to a fan, and the dome itself is attached to the vertical supporting columns of the press. The feeding-compressing container consists of a pressure feed chamber with an inbuilt heat-exchanger connected to the vacuum collector input. The upper part of the feed chamber is connected to a balance gas cylinder and its lower part is connected to the feed holes of the self-propelled and the fixed heads, on one side, and to the compressing unit, on the other, the compressing unit being also directly connected to the feed holes of the heads. The vacuum collector is a heat-insulated vacuum vessel connected to the heat-exchanger and the vacuum pumps, and, by a discharge valve, it is connected either to the user equipment or the storage of the extracted liquid phase with the heat energy accumulated in it.

The advantages of this invention are that the method is implemented through a compact apparatus, the energy costs are reduced, there is no environmental pollution and the separated liquid phase can be used as an energy carrier for different uses and for domestic needs. The apparatus is fully automatic and there is no direct contact between the operator and the treated material.

Energy obtained in the heating membranes according to the present invention is transferred directly through the membrane walls onto the filter cake formed in the chambers of the heat plates.

The present invention surmounts the vaporization problem of the prior art. The thermal energy according to the present invention creates "steam jackets" around the heating members thus vaporizing only a part of the liquid remaining in the cake after the filtration process. The advantage of the present invention is that the "steam jacket" is created in the closed volume limited by heating membranes, cake and frame. Thus, under the action of the piston effect of the "steam jacket" a great part of the residual liquid remaining after the filtration process is pushed away without vaporizing and together with the steam through the vacuum filter plates in heat exchanger where it heats the suspension entering for the next cycle. Due to this design considerable saving of thermal energy for cake drying after filtration is realized.

The present invention also overcomes the problem of heat conductivity. The filtered cake formed in chambers has the function of a thermal insulation partition between the porous partitions and the heating membranes. A great advantage of the inventive apparatus is that the porous partitions or the cloths (filter cloths) are subjected during the "drying" process only to the steam heating action and that of the water heated in the capillaries, the temperature of which, in reaching the porous partitions or the filter cloth, is markedly reduced and thus cannot influence their mechanical properties.

Still another advantage of the present invention is that the temperature of the heating membranes can be considerably higher in the beginning of the "drying" process (i.e.. 200° to 300° degrees C.). Thus, the "steam jacket" is formed in a very short period of time and with higher pressure which reduces cycle duration and energy consumption.

In the present invention the porous partitions performing the functions of filter cloths are "gas impermeable" over all their surfaces in contact area, i.e. where the plate frames are clamped together. This avoids the flow-out of liquid along the capillaries of the filter cloths.

The present invention also overcomes the energy loss disadvantage of the prior art. The feeding compressing container has a pressurized feed chamber, the upper part of which is connected to a balance gas cylinder. In case of an emergency stop of the compressing unit, i.e. the pump, the compressed gas contained in the cylinder (with a suitable volume) maintains the filtration process for a certain period of time. An economic benefit from saved filtration energy may be obtained by stopping the compressing unit at a suitable moment, thus completing the filtration process on account of the energy of the compressed gas in cylinder.

The construction according to the present invention realizes heat exchange between entering slurry and outgoing filtrate. In this way the following advantages are achieved:
 shortening of the filter process duration,
 achieving lower final humidity in filtration,
 heating of the filtered cake starts at a higher temperature,
 better protection against vacuum pump overheating is achieved,
 better extraction of the salts dissolved in the liquid is possible since only part of the liquid is vaporized.

The present invention provides for thermal frames which ensure a complete cake drying. The fully dried cake does not stick to the porus partition and is not retained by the heating membrane of the heat plate. The filtrate is separated through the porous partitions of the vacuum chambers connected with the main draining canals and deliver to the heat exchanger its accumulated heat energy.

In the present invention, the impact from the falling (vibrating) is endured entirely by the robust box and the impact body. In this manner bending and other considerable elastic deformations are avoided which reduce the effect of the shaking off. The bearings supporting the eccentrics also are not subjected to the impact action.

BRIEF DESCRIPTION OF THE DRAWING

With these and other objects in view, which will become apparent in the following detailed description, the present invention, which is shown by example only, will be clearly understood in connection with the accompanying drawing, in which.

DETAILED DESCRIPTION

Figure 1:
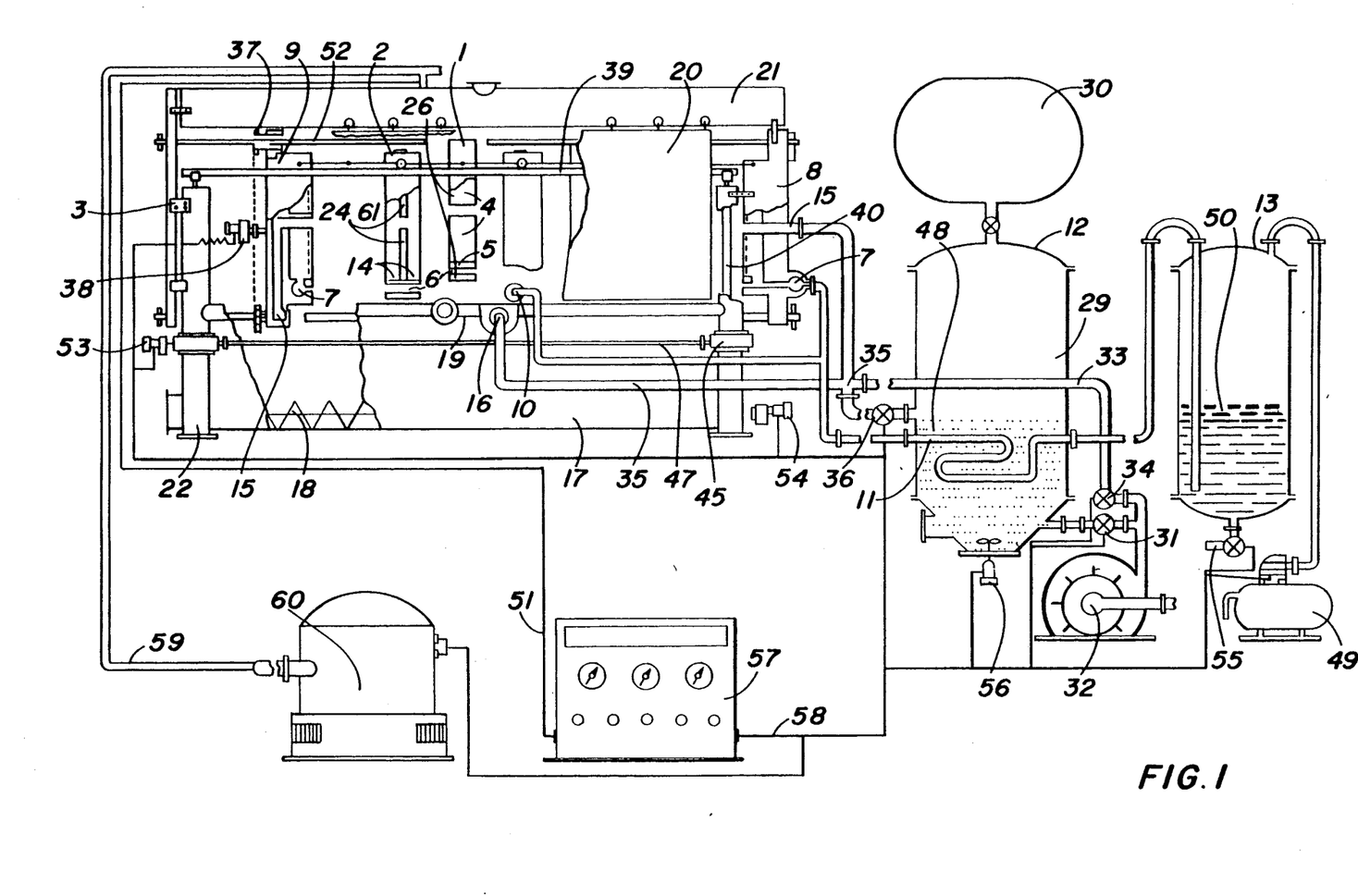
FIG. 1 is the layout of the apparatus.
Figure 2:
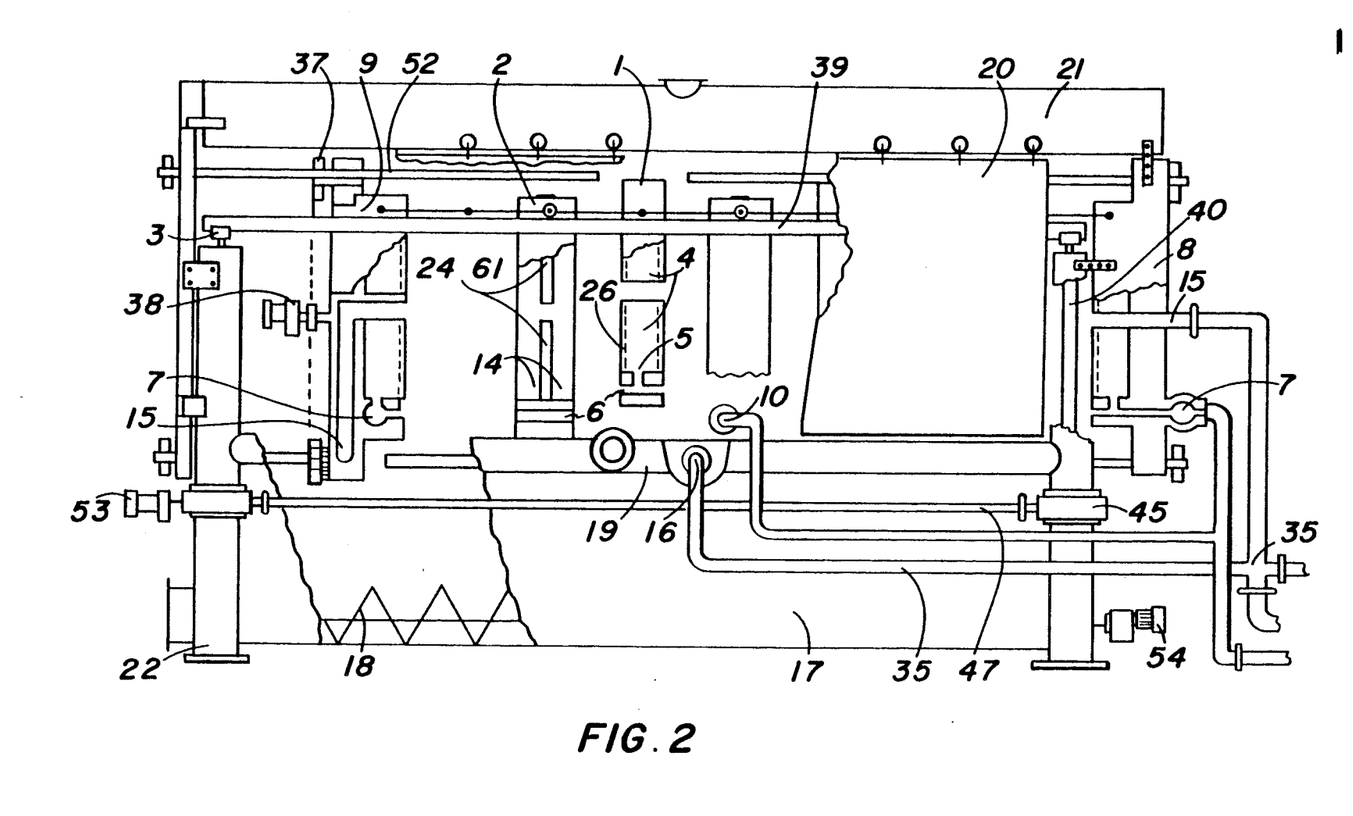
FIG. 2 is the filter press flowsheet diagram-open sidelong position.
Figure 3:
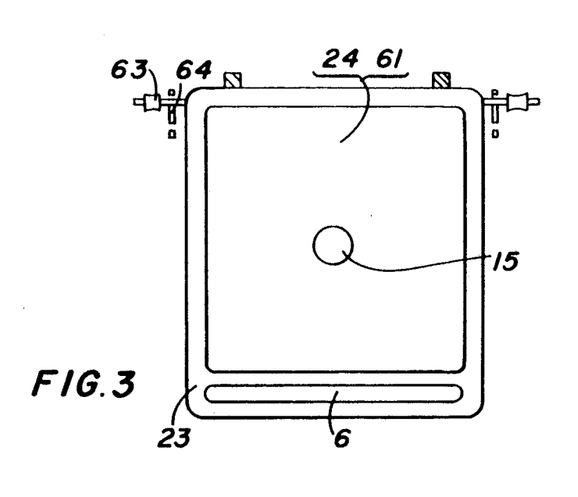
FIG. 3 is a flowsheet diagram of the filter press heat plate.
Figure 4:
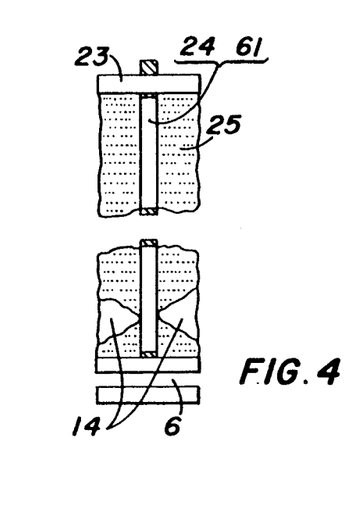
FIG. 4 is a cross-section of the heat plate.

Referring to FIGS. 1–3, the dewatering and drying filter press comprises alternating vacuum filter plates 1 and heat plates 2, connected in succession with pivots 64 and suspended on rollers 63 to vibration parallels 3. A vacuum chamber 4 is built into vacuum filter plate 1. The vacuum chamber 4, by means of intermediate canals 5, draining main canals 6 (FIG. 7) and collector pipes (manifold) 7, mounted on a fixed head 8, is connected by means of a heat exchanger 11, fitted in a feeding-compressing container 12, to the vacuum collector 13.

The draining main canals 6 are linked also with a collector pipe 7 mounted in the self-propelled head 9 and by means of the dismantlable vacuum connection 10 are linked through the heat exchanger 11 to the vacuum collector 13.

Figure 10:
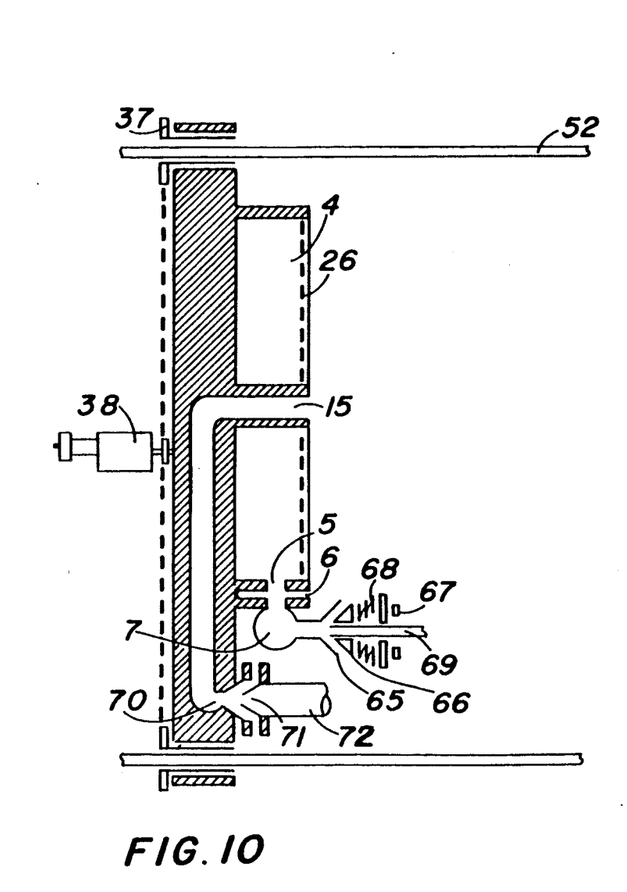
FIG. 10 is the self-propelled head cross-section flowsheet diagram.

The dismantlable vacuum connection 10 (FIG. 10) comprises a concave conical hole 65 on one side, and on the other, a moving elastic cone 66 loosely connected by guides 67 and spring 68 to a fixed pipe 69, as the moving elastic cone 66 is inserted along its center line in the fixed pipe 69.

Reception chambers 14 (FIGS. 1–4) of the heat plates 2 are connected through feeding holes 15 of the fixed head 8 to the feeding-compressing container 12.

The dismantlable pressure connection 16 (FIG. 10) comprises another concave conical hole 70 on one of its ends, and an elastic conical nozzle 71 on another end, and is attached to another fixed pipe 72, lying along the axis of the nozzle 71.

Hopper 17 with screw-worm 18 (FIGS. 1 and 2) is disposed under heads 8 and 9 and plates 1 and 2. Airducts 19 are mounted on the upper part of hopper 17 and over them mobile screens 20 are fitted, suspended on a ventilation dome 21, the latter being mounted on supporting columns 22.

Figure 5:
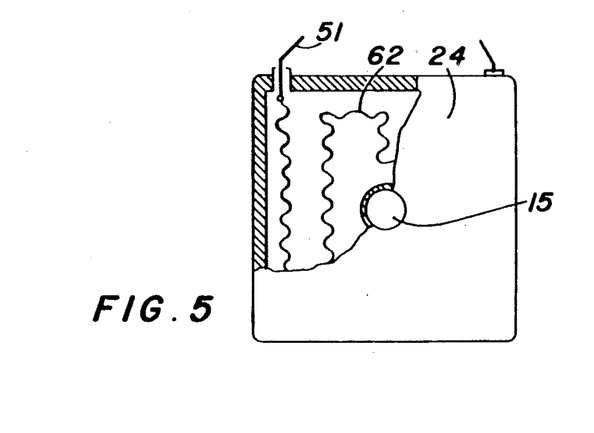
FIGS. 5 and 6 are a partial longitudinal cross-sections of the heat plate.
Figure 6:
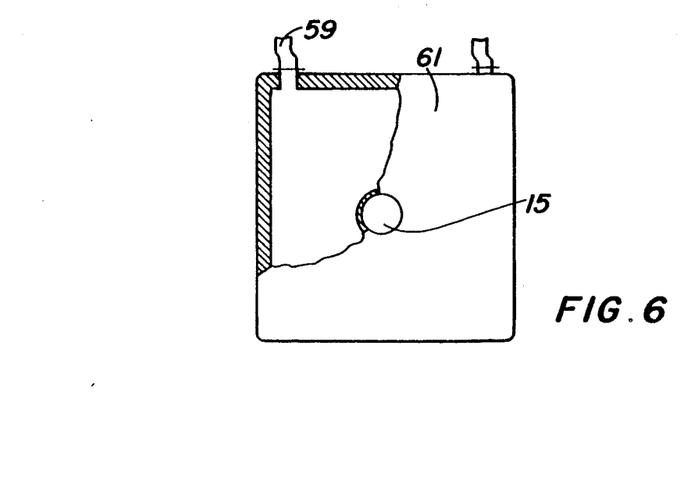

Heat plate 2 (FIGS. 3–5) is made of a closed frame 23, divided in its largest cross-section by a heating electrical membrane 24 with electric heaters 62, or a heating fluid membrane 61 of two reception chambers 14, connected to a feed hole 15. The insulated reception chambers 14, the heating membranes 24, 61, and the draining main canals 6, are all mounted on frame 23.

Figure 7:
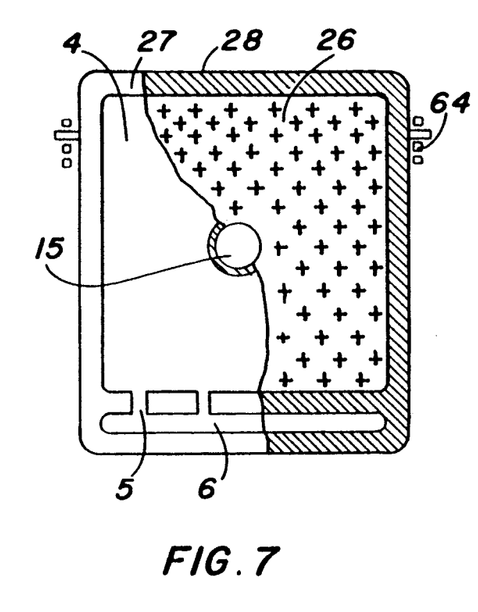
FIG. 7 is partial longitudinal cross-section of the filter press vacuum filter plate.
Figure 8:
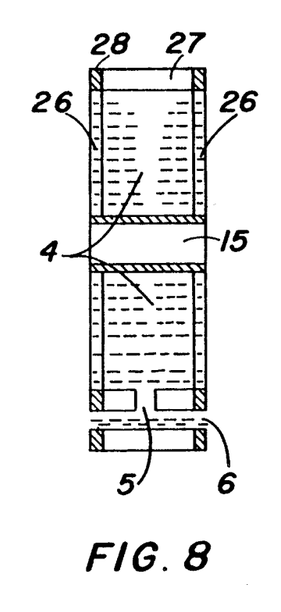
FIG. 8 is a cross-section of the vacuum-filter plate.

The slurry mass 48 enters reception chamber 14 where it is restricted by frame 23 and the opposite positioned heating membrane 24 or 61 and the porous partition 26 of vacuum filter plate 1 (FIG. 7). The vacuum filter plate 1 (FIGS. 7 and 8) is made of a closed frame 27 and vacuum chamber 4. On both sides of the vacuum chamber 4, porous partitions 26 with a feed hole 15 are fitted, which partitions 26 are gas impermeable along all their volume in the contact zone 28 with the closed frame 27. The vacuum chamber 4 is connected by intermediate canals 5 to the draining main canals 6 fitted in the closed frame 27.

Figure 9:
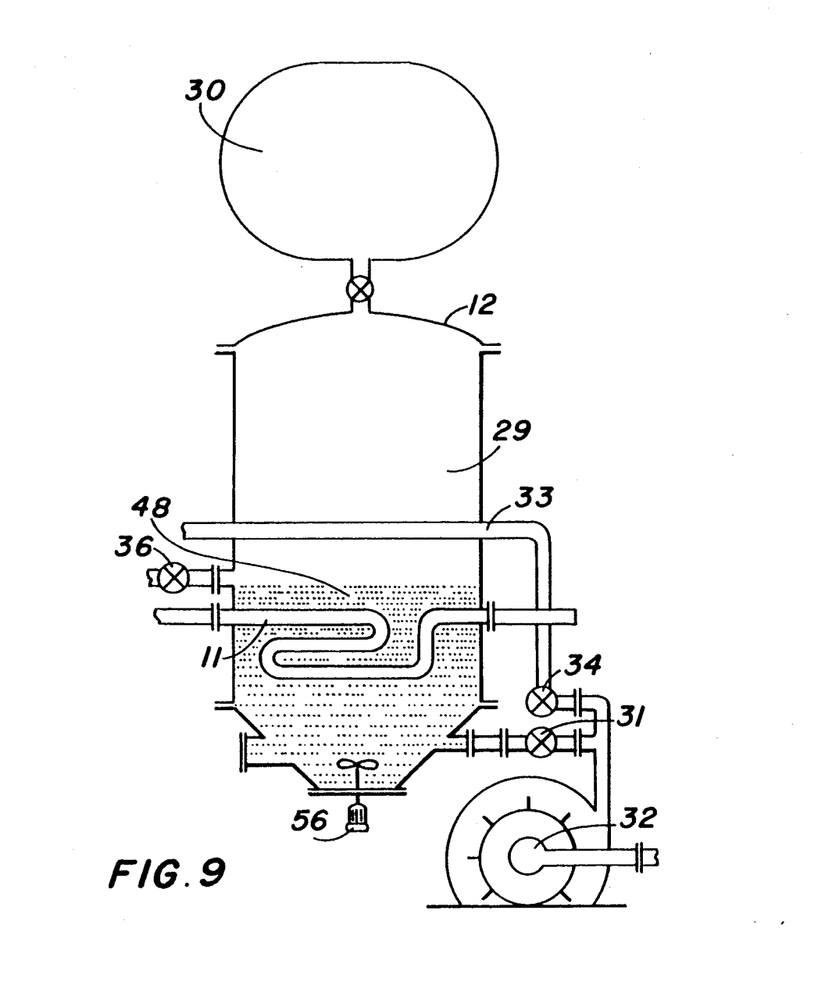
FIG. 9 is a flowsheet diagram of the feeding-compressing container.

The feeding-compressing container 12 (FIG. 9) comprises a pressure feed chamber 29 with an inbuilt heat exchanger 11. The upper part of the pressure feed chamber 29 is connected to a balance gas cylinder 30. In its lower part an agitator 56 is housed, and it is connected to the compression unit 32 by means of a valve 31. The pressure feed chamber 29 is shunted by shunting pipe 33, which by means of a second valve 34, is connected to the compressing unit 32. At the other end it is connected to pressure feed pipe 35 (FIGS. 1 and 2). The pressure feed pipe 35 is connected by a third valve 36 to the chamber 29, and its other end is connected to a feed hole 15 of the fixed head 8 and the dismantlable pressure connection 16 (FIGS. 1 and 2).

Driving nuts 37 are connected to the self-propelled head 9 (FIG. 10), which is linked to a motor reducing gear 38 and drain main canals 6 united in collector pipe 7 ending by a dismantlable vacuum connection 10. The feed hole 15 of the self-propelled head 9 ends with a dismantlable pressure connection 16 (FIG. 1). The driving nuts 37 connect the self-propelled head 9 to fixed stretching screws 52.

Figure 11:
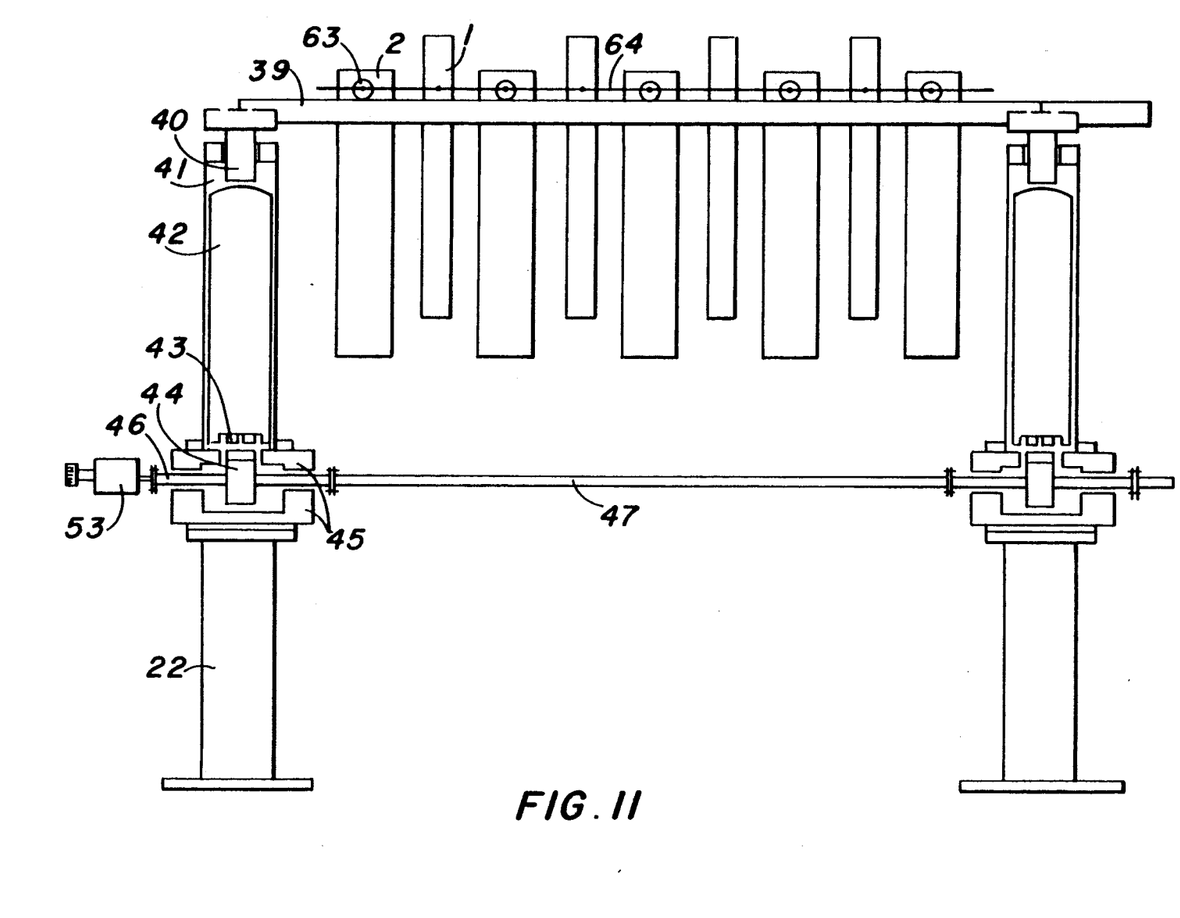
FIG. 11 is a flowsheet diagram of the filter press vibration parallels.

The vibration parallel 3 (FIG. 11) comprises supporting horizontal elements 39 connected to vertical supporting columns 22. In its lower part, each vertical support 40 stands loosely on a mobile impact body 42 with roller 43, frictionally connected to eccentric 44 resting on robust box 45, mounted on supporting column 22. The shafts 46 of the eccentrics 44 lie along the longitudinal axis of the filter press and are connected by an untwisting connection 47 and adjustable motor reducing gear 53.

The vacuum collector 13 (FIG. 1) in its upper part is connected to a vacuum pump 49, and in its lower part a drain valve 55 is fitted. The electrical control panel 57 is linked by control connections 58 to a motor reducing gear 38 and to a second motor reducing gear 54, an adjustable motor reducing gear 53, the agitator 56, valve 31, valve 34, valve 36, valve 55, the compressing unit 32, the vacuum pump 49 and the heating fluid source 60. The heating electric membrane 24 is connected by a flexible electric connection 51 to the electrical control panel 57, and the heating fluid membrane 61 is linked to the heating fluid source 60 by a flexible pipe connection 59.

MANNER OF OPERATION

The apparatus operates as follows:

The mixture (slurry mass) to be thickened, filtered and dried of enters the closed filter press under the effect of the compressing unit 32 through valve 34, the shunting pipe 33, the feed pressure pipe 35, the feeding hole 15 of the fixed head 8 and the dismantlable pressure connection 16 and feed hole 15 of the self-propelled head 9 in the reception chamber 14 of the heat plates 2. Under the pressure of the entering slurry mass 48, the elastic conical nozzle 71 expands and fits closely in the concave conical hole 70, so that in closed position the dismantlable pressure connection 16 is self-sealed and no liquid runs out.

Simultaneously, in the initial cycle, the pressure feed chamber 29 is filled through valve 31.

After the reception chamber 14 is filled, the shunting pipe 33 is switched off, using valve 34, after which the compressing process starts where slurry 48 is fed from the pressure feed chamber 29 by means of valve 36. Pressure in the balance gas cylinder 30 is levelled off with that of the compressing unit 32.

In case of emergency stop of the compressing unit, the compressed gas contained in the balance gas cylinder (with suitable volume) maintains the filtration process for a certain time period. When the electric supply is cut off, valves 31 and 34 remain closed, and the filtration process continues at the expense of the gas compressed in the cylinder 30. Thus certain energy autonomy of filtration is achieved.

The vacuum formed in the vacuum collector 13 by vacuum pump 49 begins to take effect as from the initial delivery of slurry 48 into the closed filter press. Thus, vacuum is formed in vacuum chambers 4 by means of heat-exchanger 11, dismantlable vacuum connection 10, collector pipes 7, draining main canals 6 and intermediate canals 5. When the self-propelled head 9 closes, the dismantlable vacuum connection 10 is sealed, as a result of pressing the elastic cone 66 to the walls of the concave conical hole 65 under the effect of spring 68. This effect is intensified by vacuum action, and dismantlable vacuum connection 10 is self-sealed, eliminating any chance of atmospheric air entry. Under the vacuum effect, the filtrate 50 begins to run across the porous partitions 26 into the vacuum chambers 4, the filtration rate increasing because of the hydraulic pressure formed in the reception chambers 14. Under this combined action, the filtrate 50 runs out and is accumulated in the vacuum collector 13.

After the peak values of the pressure and vacuum, necessary for dewatering of the cake 25 in the chambers 14 are reached, electric voltage is transmitted to heating membranes 24 by the flexible electrical connection 51 from the electrical control panel 57, or heating fluid to membranes 61 by way of flexible pipe connection 59 from the heating fluid source 60. The sharp temperature rise creates a "steam jacket" around membranes 24 or 61 and under its action intensive pushing out of the capillary liquid from the cake 25 begins from membranes 24 or 61 towards the porous partitions 26. There, under the vacuum effect, both the liquid and the gas phases are sucked in and collected in vacuum collector 13 together with the heat energy accumulated in them. Part of the accumulated heat energy is transferred by means of heat-exchanger 11 to pulp mass present in the pressure feed chamber 29.

Thus, during the next cycle, slurry 48 enters with a higher temperature, accelerating the filtration process rate, realizing cycle time reduction and lower energy consumption. The pushing out, or rather the "extraction" of the capillary liquid from cake 25 considerably reduces the energy required for drying, i.e. for evaporation, as a considerable part of the liquid phase is not transformed into steam.

After reaching the required final humidity, the vacuum is released and the filter press opens by the action of the self-propelled head 9. The self-propelled head 9 is set into motion by means of motor reducing gear 38, connected to driving nuts 37. The latter revolve around the fixed stretching screws 52.

The blowing over of the cake 25, separated in the reception chambers 14 is effected through the ventilation dome 21, which intakes the required air from airducts 19. This ventilation system ensures the ventilation of the space of the filter press where the vacuum filter plates 1 and the heat plates 2 are disposed. In the case of open plates position, the ventilation dome 21 is sucking out all the residual vapors separated from the cake 25 collected in the reception chamber 14 while the necessary compensating air fed through air ducts 19 flows uniformly and laminarly through the interspaces of the set apart vacuum filter plates 1 and heat plates 2.

When the cake 25 has been dried to the required final moisture or after supplementary blowing over, if needed, the regulated motor reducing gear 53 is switched on, which, through eccentrics 44 and impact bodies 42, sets vibration parallels 3 in vertical motion, where the latter are raised under the action of the eccentric 44, and then drop free, and through vertical supports 40 and mobile impact bodies 42 strike on the robust box 45, mounted on supporting columns 22.

The next cycle starts after shaking off of the cake 25. The pure filtrate 50, accumulated in the vacuum collector 13, together with the heat energy accumulated in it, is periodically discharged through drain valve 55 to be used for industrial or municipal needs. The cycles proceed without any environmental pollution with dust, aerosols, steam, vapors or any other components included in the treated slurry mass.

The servicing of the inner part of the press is carried out by opening mobile screens 20. The electric supply, control and adjustment of the filter press operation, the operation of the feeding-compressing container 12 and that of the vacuum collector 13 is effected from the electrical control panels by means of control connections 58.

Electrical current to heating membranes 24 is supplied by means of flexible electric connection 51 from the electrical control panel 57, heating membranes 61 are supplied with heating fluid from source 60 through a flexible pipe connection 59, the operation being monitored and controlled from electrical control panel 57.

The simultaneous supply and draining of the filter press by fixed head 8 and self-propelled head 9 considerably accelerates the production cycle.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A method of dewatering and drying of a slurry liquid/solid mass comprising the steps of
   compressing the slurry mass under pressure and feeding it into a reception chamber defined by a solid frame and having a confronting heating membrane and a porous partition;
   forming vacuum in said reception chamber to draw the liquid component of said slurry mass through said porous partition;
   effecting maximum dewatering under the action of pressure and vacuum; thereafter heating said heating membrane to form a "steam jacket" around said heating membrane, thereby extracting through said porous partition the residual liquid and said "steam jacket" from said slurry mass and discharging the separated solid component of said slurry mass from said reception chamber.

2. The method as set forth in claim 1, wherein said "steam jacket" and said residual liquid together with the thermal energy accumulated therein are drawn through said porous partition and delivered to a heat exchanger to preheat the slurry entering for the next cycle.

* * * * *